July 26, 1927.
H. B. ELLIOTT
AUTOMOTIVE BRAKE
Filed Feb. 20, 1926
1,636,686
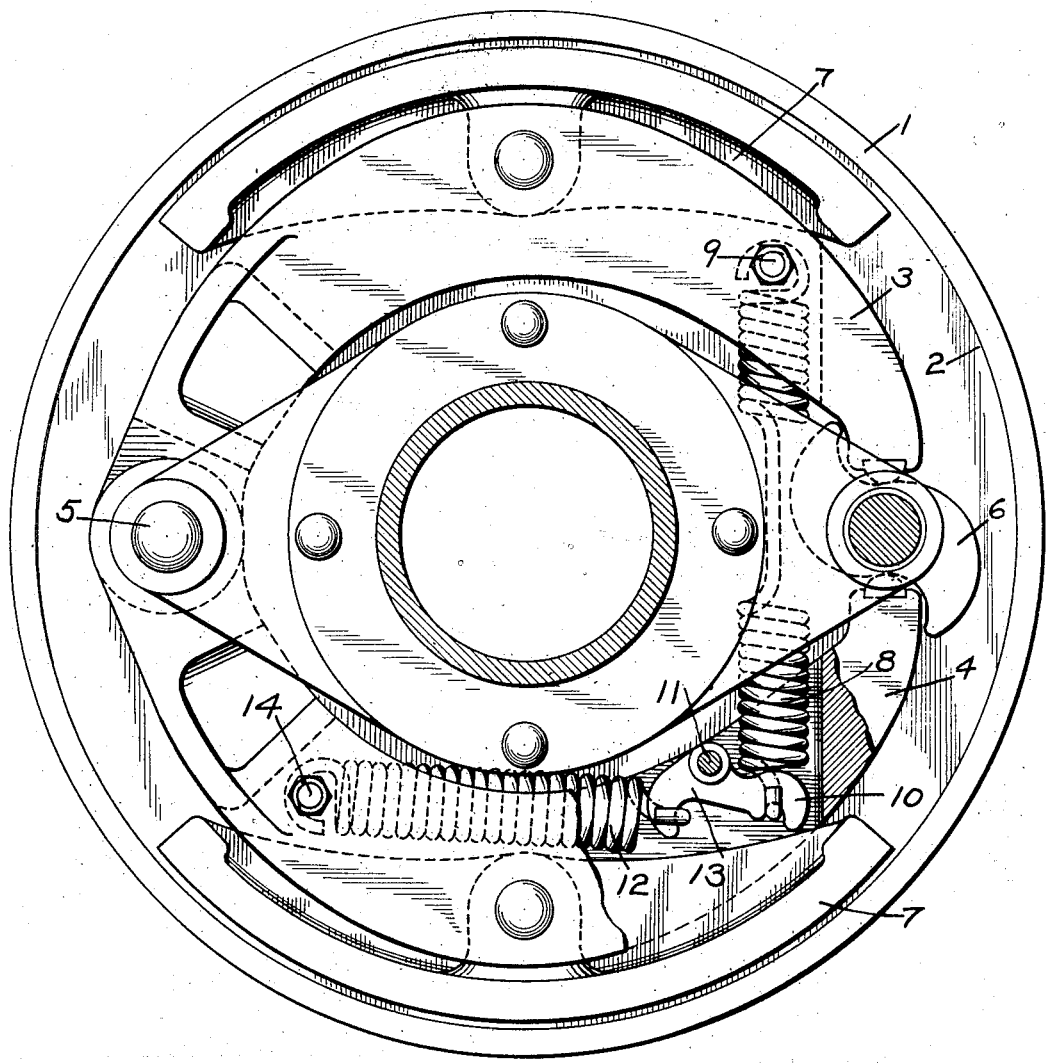
INVENTOR
HOWARD B. ELLIOTT
BY *Wm. M. Cady*
ATTORNEY Patented July 26, 1927.

1,636,686

UNITED STATES PATENT OFFICE.

HOWARD B. ELLIOTT, OF OAKLAND, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed February 20, 1926. Serial No. 89,814.

This invention relates to brakes, and more particularly to a brake of the automotive vehicle type, in which a brake drum is provided having an internal friction face and movable braking members having brake shoes adapted to engage said friction face.

With a brake of the above type, particularly when metal brake shoes are employed, it has been deemed desirable to provide thick brake shoes and renewable brake drum liners, so that an increased amount of wear can occur, before it becomes necessary to replace the brake shoes. Due to the greater permissible wear of the brake shoes, the expansible movement of the braking members is increased and as a consequence, the usual release spring is stretched to a greater extent. This increased stretching of the release spring requires increased power to overcome the resistance of the spring in applying the brakes, and since the length of the spring is necessarily limited, there is a possibility that the spring may be stretched beyond its elastic limit and thus take on a permanent set.

The principal object of my invention is to provide a brake release spring construction in which the above difficulties are obviated.

In the accompanying drawing, the single figure is a face view of an internal expanding drum brake with my improvement applied thereto.

The brake construction may comprise a brake drum 1 having an internal friction face 2 and brake heads 3 and 4 mounted within the drum and connected together by a hinge pin 5. Interposed between the free ends of the brake heads 3 and 4 is a cam 6, the rotation of which is adapted to effect the expansible movement of the brake heads.

A brake shoe 7 is pivotally connected to each brake head and is provided with an arcuate friction face adapted to engage the internal friction face 2 of the drum 1.

According to my invention, the release spring construction comprises a plurality of springs, connected in series, so that a sufficient length of release spring is provided to prevent undue stretching. As shown in the drawing, one release spring 8 may be connected to the brake head 3, said spring extending into a channel formed in the brake head and having its hook-shaped end supported by a bolt 9 secured to the brake head.

The other end of the spring 8 is also provided with a hook which engages one arm 10 of a bell crank lever, mounted within the channel of the brake head 4 and carried by a pivot pin 11 which is secured to said brake head.

One end of another release spring 12 is connected to the other arm 13 of said bell crank lever, and the other end of said spring is connected to the brake head 4 by means of a bolt 14.

It will be evident that when the brakes heads 3 and 4 are expanded in applying the brakes, both release springs 8 and 12 act in series through the bell crank lever connection, so that in effect, a long release spring is provided and thus stretching of the spring beyond the elastic limit is prevented and resistance of the spring to the expansive movement of the brake heads is reduced.

Having now described my invention, what I claim as new and desire to secure by Letters Patent, is:—

1. In a vehicle brake, the combination with a brake drum and expansible brake heads mounted within said drum, of a release spring having one end connected to one brake head and extending to the other brake head, a second release spring connected to said other brake head, and a bell crank lever connected to one end of each spring.

2. In a vehicle brake, the combination with a brake drum and expansible brake heads mounted within said drum, of a release spring connected to one brake head, a release spring connected to the other brake head, and a movable bell crank lever having one arm connected to one spring and the other arm to the other release spring.

3. In a vehicle brake, the combination with a brake drum and expansible brake heads mounted within said drum, of a release spring having one end connected to one brake head and extending to the other brake head, a release spring having one end connected to the other brake head, and a bell crank lever pivotally connected to said other brake head and having one arm connected to the other end of one release spring and the other arm connected to the other end of the other release spring.

In testimony whereof I have hereunto set my hand.

HOWARD B. ELLIOTT.